United States Patent [19]

Welguisz et al.

[11] Patent Number: 5,743,100
[45] Date of Patent: Apr. 28, 1998

[54] METHOD FOR CONTROLLING AN AIR CONDITIONING SYSTEM FOR OPTIMUM HUMIDITY CONTROL

[75] Inventors: Richard F. Welguisz, Tyler; Stephen E. Guy, Longview, both of Tex.; John T. Taylor, Dunnellon, Fla.

[73] Assignee: American Standard Inc., Piscataway, N.J.

[21] Appl. No.: 725,789

[22] Filed: Oct. 4, 1996

[51] Int. Cl.[6] .................................................. G05D 23/32
[52] U.S. Cl. .............................. 62/158; 62/182; 236/46 F
[58] Field of Search ..................... 62/180, 182, 158; 236/46 R, 46 F

[56] References Cited

U.S. PATENT DOCUMENTS

| | | | |
|---|---|---|---|
| 3,762,178 | 10/1973 | Yamada et al. | 62/180 X |
| 4,286,751 | 9/1981 | Fowler . | |
| 4,292,813 | 10/1981 | Paddock | 236/46 F X |
| 4,449,375 | 5/1984 | Briccetti | 62/180 X |
| 4,595,139 | 6/1986 | Levine . | |
| 4,667,874 | 5/1987 | Johnson et al. . | |
| 4,735,054 | 4/1988 | Beckey . | |
| 4,860,552 | 8/1989 | Beckey | 62/158 |
| 5,011,073 | 4/1991 | Izaguirre, Sr. et al. . | |
| 5,319,942 | 6/1994 | Paustian et al. | 62/180 X |
| 5,582,233 | 12/1996 | Noto | 236/46 R X |

FOREIGN PATENT DOCUMENTS 185928   10/1984   Japan ........................................ 62/158

Primary Examiner—Denise L. Ferensic
Assistant Examiner—Susanne C. Tinker
Attorney, Agent, or Firm—William J. Beres; William O'Driscoll; Peter D. Ferguson

[57] ABSTRACT

A method of operating a heat pump or air conditioner system is provided. The air conditioner comprises a compressor, a condenser, an expansion device, a cooling coil and an air mover (blower). According to the preferred embodiment, the air mover (blower) is activated at a time after the compressor has been activated to pre-cool the cooling coil and allow for more efficient and effective moisture removal. Also, deactivation of the air handler is delayed for some time after the compressor is deactivated to allow for utilization for the residual cooling ability of the cooling coil due to the presence of cold refrigerant in the cooling coil when the compressor is deactivated.

17 Claims, 1 Drawing Sheet

FIG. 1
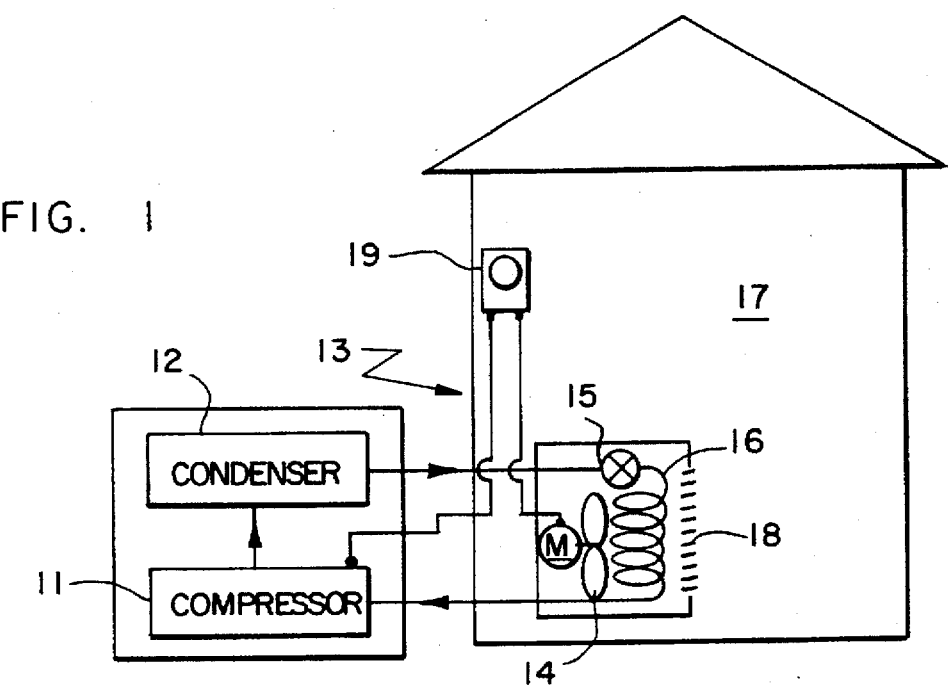
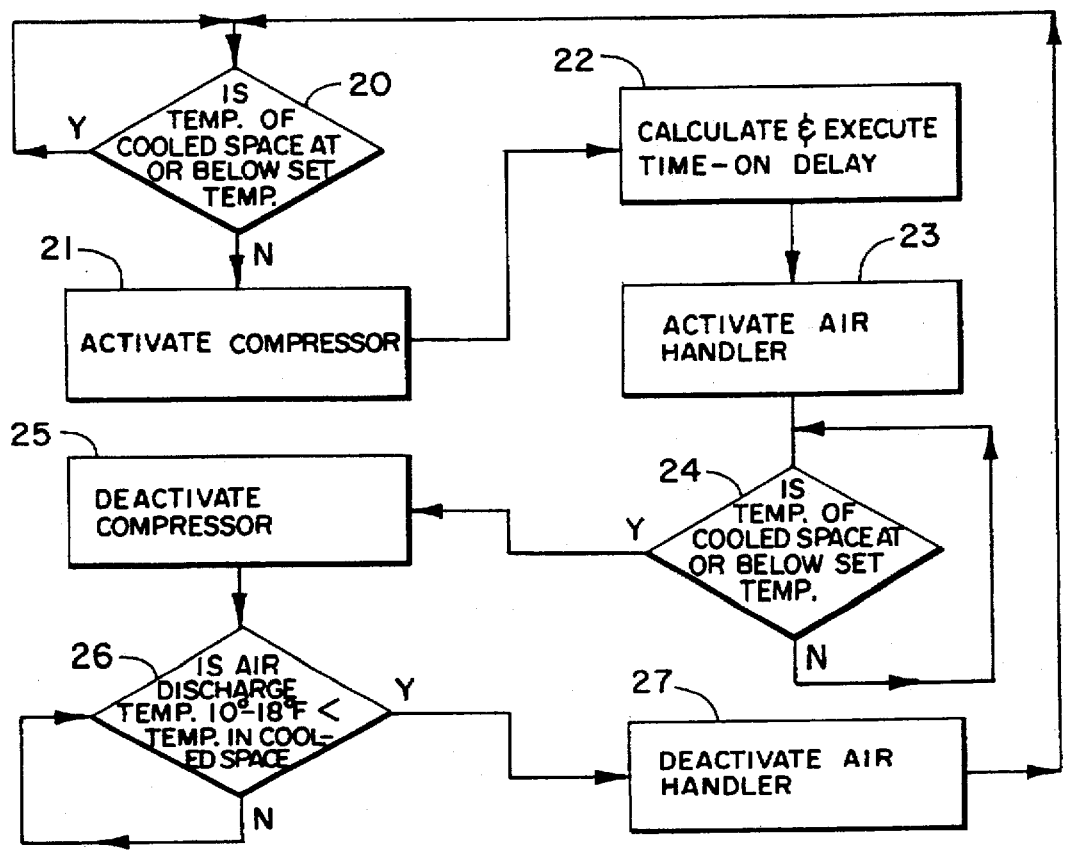
FIG. 2

METHOD FOR CONTROLLING AN AIR CONDITIONING SYSTEM FOR OPTIMUM HUMIDITY CONTROL

TECHNICAL FIELD

This invention relates to a control method for a heat pump in cooling or an air conditioner. Specifically, the present invention is directed to a control method for a comfort cooling system that (1) increases the cooling comfort level through increased moisture removal by delaying the activation of the blower and (2) increases cooling efficiency by delaying blower deactivation after compressor deactivation.

BACKGROUND OF THE INVENTION

The typical home air conditioning and heat pump system comprises a compressor, a condenser, an expansion device, a cooling evaporator coil and an air blower that forces indoor air across the cooling coil. The compressor and the air cooled condenser are typically located outdoors, and the expansion device, the cooling coil and the air blower are located indoors, very often in the space to be cooled.

In the air conditioning (cooling) cycle, the compressor compresses gaseous refrigerant returned from the indoor cooling coil, thereby increasing its pressure and temperature. The hot, high pressure refrigerant leaving the compressor is passed to the air cooled condenser where it is condensed through heat exchange with outside air. The still warm, liquid refrigerant then passes to the indoor expansion device adjacent to the cooling coil. As the refrigerant expands and evaporates in the cooling coil, it cools significantly. The air handler forces indoor air across the cooling coil and distributes the cooled air into the cooled space, thereby cooling the indoor air. In addition to temperature control, humidity control is also achieved to the extent that water vapor from the cooled air condenses on the cooling coil, thereby removing moisture from the cooled space and providing a more comfortable environment.

In a conventional air conditioner, the compressor and the air blower run simultaneously. The air blower is activated when the compressor is activated, and the air blower is deactivated when the compressor is deactivated. Thus, when the air blower is activated, the cooling coil is full of refrigerant vapor which is warmer than the working temperature of the cooling coil because the compressor has been inactive. Also, when the air blower is deactivated, the cooling coil is full of liquid refrigerant and vapor at or near its working temperature because the compressor has been active.

Moisture is removed from the air by water condensation on the cooling coil. During the first five (5) to ten (10) minutes of system activation, the cooling coil does not get sufficiently cold to effectively remove humidity from the cooled space through condensation on the cooling coil. Ineffective humidity control is particularly problematic in extremely humid and muggy conditions where moisture removal is central to climate control and comfort. Ineffective humidity control is also problematic under light cooling load conditions (mild weather cooling) when the cooling system has short run times. In order for condensation to take place, the cooling coil must reach a temperature at or below the dew point temperature of the indoor air. However, activation and deactivation of the compressor and air blower are driven by temperature, usually controlled by an indoor wall mounted thermostatic control, which does not account for humidity. Thus, the compressor and air blower are deactivated so long as the setpoint range temperature is satisfied, regardless of humidity control.

When the compressor and air blower are activated in response to a sensed temperature above the upper setpoint temperature, the system operates in a dynamic fashion until steady state is achieved. Usually, the air conditioner has been inactive for a period of time, and the indoor cooling coil has had time to warm up and the moisture on the coil has drained. Thus, when the compressor and air handler are simultaneously activated, initially, the air handler forces warm indoor air across a relatively warm cooling coil. As a result, a good portion of the heat removal capacity of the initially cold refrigerant that enters the cooling coil is spent cooling warm indoor air rather than cooling the cooling coil to its desired steady-state temperature at or below the indoor air dewpoint and in removing moisture from the air. These initial conditions can substantially retard attainment of the desired steady-state temperature at or below the indoor air dewpoint temperature necessary for humidity control. This may cause the sensible temperature setpoint to be reached and the compressor deactivated without adequate condensation of moisture on the cooling coil for humidity control.

When the compressor is deactivated, the cooling coil is full of refrigerant which is at or near its operating temperature. Therefore, when the air mover is deactivated simultaneously with the compressor, any residual cooling ability of the cooling coil due to the low temperature of the refrigerant is lost.

Therefore, it is an object of the present invention to provide a method of operating an air conditioner that provides enhanced humidity removal relative to conventional air conditioners.

It is another object of the present invention to provide a method of operating an air conditioner that increases cooling efficiency by utilizing the residual cooling and moisture removal ability of cold refrigerant left in the cooling coil when the compressor is deactivated.

These and other objects are achieved by the present invention detailed below.

SUMMARY OF THE INVENTION

The present invention provides a method of conditioning the air in a space, which comprises the steps of:
 a. providing a compressor, a condenser, an expansion device, and a cooling coil, operatively connected to function as an air conditioner;
 b. providing an air mover for passing air from a space across the cooling coil to cool and dehumidify the air, then back into the space;
 c. alternately activating and deactivating the compressor;
 d. substantially at the time the compressor is activated, determining the amount of time which has elapsed since the compressor was last deactivated;
 e. determining a time-on delay for activating the air handler; and
 f. after the compressor has been activated for a period substantially equal to the time-on delay, activating the air mover.

The air mover is preferably a fan which is located near the cooling coil. The compressor and the condenser are preferably located outdoors, and the expansion device, the cooling coil and the air mover are located indoors. The time-on delay is preferably the lesser of one-sixteenth of the time the compressor had been deactivated or 45 seconds.

The present invention provides a second method of conditioning the air in a space, which comprises the steps of:
 a. providing a compressor, a condenser, an expansion device, a cooling coil and an air handler, operatively connected to function as an air conditioner to keep a space substantially at a set-point temperature;

b. deactivating said compressor when the temperature in the space does not exceed the set-point temperature;

c. after deactivating said compressor, detecting a first temperature of the air passed across said cooling coil at a point where said air goes back into said space;

d. after deactivating said compressor, detecting a second temperature of the air in said space; and e. deactivating said air mover when said first temperature is not more than about 18° F. below said second temperature.

The air mover is preferably a fan which is located near the cooling coil. The compressor and the condenser are preferably located outdoors, and the expansion device, the cooling coil and the air handler are located indoors. The time-on delay is preferably the lesser of 80 seconds from the time the compressor had been deactivated or the time to reach a temperature difference between the first and second temperatures in the range of 18° F. (10° C.) to 10° F. (5.6° C.), preferably about 14° F. (8° C.). The preferred first temperature for deactivation is about 14° F. (8° C.).

The present invention provides a second method of conditioning the air in a space, which comprises the steps of:

a. providing a compressor, a condenser, an expansion device, a cooling coil and an air mover, operatively connected to function as an air conditioner to keep a space substantially at a set-point temperature;

b. deactivating said compressor when the temperature in the space does not exceed the set-point temperature;

c. after deactivating said compressor, detecting a first temperature of the air passed across said cooling coil at a point where said air goes back into said space;

d. after deactivating said compressor, detecting a second temperature of the air in said space; and e. deactivating said air handler when said first temperature is not more than about 18° F. (10° C.) below said second temperature.

The temperature difference used in step e. can alternatively be any selected temperature between about 10° F. (5.6° C.) and about 18° F. (10° C.) but is preferably about 14° F. (8° C.).

BRIEF DESCRIPTION OF THE DRAWINGS

FIG. 1 is a schematic illustration of the placement of conventional air conditioner components in a building.

FIG. 2 is a flow chart illustrating the methods of the present invention.

DETAILED DESCRIPTION OF THE PREFERRED EMBODIMENTS

FIG. 1 illustrates the general placement of air conditioner components in a conventional air conditioning system which may be used according to the present method. A compressor 11 and an air cooled condenser 12 are located outside of the house 13 to be cooled. An air mover 14 such as a fan, an expansion device 15 and a cooling coil 16 are located inside the cooled space 17 of the house 13. In operation, gaseous refrigerant returned from cooling the coil 16 is compressed by the compressor 11, thereby increasing the refrigerant pressure and temperature. The hot, high pressure refrigerant leaving the compressor 11 then passes to the air cooled condenser 12 where it is condensed through heat exchange with outside air. The still warm but now liquid refrigerant then flows to the expansion device 15 which is located adjacent to the cooling coil 16. As the refrigerant quickly expands through the expansion device 15 and subsequently evaporates in the cooling coil 16, it cools significantly. The air mover 14 forces air across the cooling cool 16 into the cooled space 17 through a cool air discharge 18. A thermostat 19, which may be of a conventional type, is located within the cooled space 17 and provides control for the air conditioning system. The thermostat 19 typically comprises a temperature sensing device in conjunction with other conventional elements (not shown in FIG. 1) which are known to those of ordinary skill.

Referring now to FIGS. 1 and 2, the present method is illustrated. The thermostat 19 carries out a temperature comparison step 20 by determining whether the temperature in the cooled space 17 is at or below the upper setpoint temperature of the thermostat 19. If the sensed temperature in the space 17 is not at or below the upper setpoint temperature of the thermostat 19, the compressor 11 is activated per the step 21. According to the present invention, the air handler 14 is not activated to force air across the cooling coil 16 until after a time-on delay interval calculated and executed in step 22, which may be determined based on the elapsed time since the compressor 11 in the step 21 was last deactivated. Preferably, the time-on delay between activation of the compressor 11 in step 21 and activation of the air handler 14 in the step 23 is about one-sixteenth of the time the compressor 11 in the step 21 had been off in seconds or 45 seconds whichever is less.

Activation of the air handler 14 in the step 23 after activation of the compressor in the step 21 allows cold refrigerant to fill the cooling coil 16 prior to warm indoor air being forced across it. The cooling coil 16 is therefore pre-cooled, preferably to a temperature at or below the dew point of the indoor air, thereby providing for the immediate removal of moisture by condensation on the cooling coil 16.

Once the sensed temperature in the space 17 is found to be at or below the set temperature in the step 24, the compressor 11 is deactivated (step 25). Then the difference between the temperature at the cool air discharge 18 and the cooled space 17 is measured in the step 26. According to present method, deactivation of the air mover 14 is delayed for some time after the compressor is deactivated (step 27). This allows for more efficient cooling by making use of the residual cooling ability of the cold refrigerant in the cooling coil at the point when the compressor is deactivated. The air mover continues to run until the air temperature at the point where the air re-enters the cooled space at the cool air discharge after being passed across the cooling coil is a predetermined amount less than the air temperature of the cooled space. The predetermined temperature difference may be any value from about 10° F.–18° F. (from about 5.6° C. to about 10° C.), most preferably about 14° F. (8° C.), in general. A maximum on time delay of 80 seconds is established to avoid running the fan indefinitely.

While particular elements, embodiments, and applications of the present have been described, it will be understood, of course, that the invention is not limited thereto, since modifications may be made by those skilled in the art, particularly in light of the foregoing teachings. It is therefore contemplated by the appended claims to cover such modifications as incorporate those features which would come within the spirit and scope of the invention.

We claim:

1. A method of conditioning the air in a space, which comprises the steps of:

a. providing a compressor, a condenser, an expansion device, and a cooling coil, operatively connected to function as an air conditioner;

b. providing an air mover for passing air from a space across the cooling coil to cool and dehumidify the air, then back into the space;

c. alternately activating and deactivating the compressor;

d. substantially at the time the compressor is activated, determining the amount of time which has elapsed since the compressor was last deactivated;

e. determining a time-on delay for activating the air mover, where the time-on delay is a function of the amount of time since the compressor was last deactivated; and f. after the compressor has been activated for a period substantially equal to the time-on delay, activating the air mover.

2. The method according to claim 1, wherein the air mover comprises a fan.

3. The method to claim 1, wherein the compressor and the condenser are located outside the space.

4. The method of claim 1, wherein the time-on delay is about 45 seconds or less.

5. The method according to claim 1, wherein the time-on delay is the lesser of about one-sixteenth of the time since the compressor was last deactivated or 45 seconds.

6. A method of conditioning the air in a space, which comprises the steps of:

a. providing a compressor, a condenser, an expansion device, a cooling coil and an air handler, operatively connected to function as an air conditioner to keep a space substantially at a set-point temperature;

b. deactivating said compressor when the temperature in the space does not exceed the set-point temperature;

c. after deactivating said compressor, detecting a first temperature of the air passed across said cooling coil at a point where said air goes back into said space;

d. after deactivating said compressor, detecting a second temperature of the air in said space; and e. deactivating said air handler when said first temperature is not more than about 18° F. below said second temperature.

7. The method according to claim 6, wherein the air handler comprises a fan.

8. The method to claim 6, wherein the compressor and the condenser are located outside the space.

9. The method of claim 6, wherein the time-on delay is about 80 seconds or less.

10. The method according to claim 6, wherein the time-on delay is the lesser of 80 seconds since the compressor was last deactivated or the time to reach a predetermined temperature difference between the first and second temperatures of 18° F. (10° C.) to 10° F. (5.6° C.).

11. A method of maximizing humidity removal by an air conditioning system having an air moving unit, comprising the steps of:

determining that air conditioning is called for;

starting a compressor of the air conditioning system when air conditioning is called for;

operating the compressor for a first time period so as to pre-cool a cooling coil; and starting, after the expiration of the first time period, the air moving unit to blow air across the cooling coil;

wherein the length of the first time period is a function of a first predetermined amount of time and a function of the off time between compressor run cycles.

12. The method of claim 11 including the further steps of:

determining that air conditioning is no longer called for;

turning off the compressor when air conditioning is no longer called for;

operating the air moving unit for a second time period after the compressor is turned off; and turning off the air moving unit at the expiration of the second time period;

wherein the second time period is a function of indoor air temperature.

13. The method of claim 12 wherein the second time period continues until the temperature of air discharged by the air moving unit is greater than or equal to the indoor air temperature as measured by a thermostat less a predetermined temperature.

14. The method of claim 13 wherein the predetermined temperature difference ranges between 18° F. (10° C.) and 10° F. (5.6° C.).

15. The method of claim 14 wherein the predetermined temperature difference is about 14° F. (8° C.).

16. A method of maximizing humidity removal by an air conditioning system having an air handling unit, comprising the steps of:

determining that air conditioning is no longer called for;

turning off a compressor of the air conditioning system when air conditioning is no longer called for;

operating the air handling unit for a second time period after the compressor is turned off so as to reduce humidity by moving air across a cooling coil of the air conditioning system while the cooling coil has latent cooling capacity; and turning off the air handling unit at the expiration of the second time period;

wherein the second time period is a function of the difference between a discharge temperature of the air moving across the cooling coil and an indoor air temperature.

17. A method of maximizing humidity removal by an air conditioning system having an air handling unit, comprising the steps of:

determining that air conditioning is no longer called for;

turning off a compressor of the air conditioning system when air conditioning is no longer called for;

operating an air handling unit for a second time period after the compressor is turned off; and turning off the air handling unit at the expiration of the second time period wherein the second time period is a function of indoor air temperature;

determining that air conditioning is called for;

starting the compressor when air conditioning is called for;

operating the compressor for a first time period so as to pre-cool a cooling coil; and starting, after the expiration of the first time period, the air handling unit to blow air across the cooling coil;

wherein the length of the first time period is a function of a first predetermined amount of time and a function of the off time between compressor run cycles.

* * * * *